United States Patent [19]
Nelson et al.

[11] Patent Number: 5,865,419
[45] Date of Patent: Feb. 2, 1999

[54] PNEUMATIC ACTUATOR HAVING AN END MOUNTED CONTROL DEVICE

[75] Inventors: David C. Nelson, Grafton; Richard R. Marchesseault, Marlborough, both of Mass.

[73] Assignee: Worcestor Controls Licenseco, Inc., Wilmington, Del.

[21] Appl. No.: 620,295

[22] Filed: Mar. 22, 1996

[51] Int. Cl.$^6$ .................................................. F16K 31/122
[52] U.S. Cl. .................... 251/28; 251/58; 137/596.14; 91/442
[58] Field of Search .................................. 251/28, 30.02, 251/58; 137/596, 596.14; 91/442

[56] References Cited

U.S. PATENT DOCUMENTS

| | | |
|---|---|---|
| 4,238,109 | 12/1980 | Powers . |
| 4,253,640 | 3/1981 | Priese et al. . |
| 4,478,245 | 10/1984 | Bender . |
| 4,763,691 | 8/1988 | Hahmann ............................ 137/596.14 |
| 5,263,679 | 11/1993 | Bushnell .................................... 251/28 |
| 5,465,746 | 11/1995 | Ebbing .................................. 251/28 X |

FOREIGN PATENT DOCUMENTS

| | | |
|---|---|---|
| 0 016 553 | 10/1980 | European Pat. Off. . |
| 0 073 268 | 3/1983 | European Pat. Off. . |
| 0 182 408 | 5/1986 | European Pat. Off. . |
| 94 09 093.9 | 9/1994 | Germany . |
| 44 38 293 A1 | 5/1996 | Germany . |
| 61-038285 | 2/1986 | Japan . |
| WO 89/05938 | 6/1989 | WIPO . |

*Primary Examiner*—Kevin Lee
*Attorney, Agent, or Firm*—Pollock, Vande Sande & Amernick, R.L.L.P.

[57] ABSTRACT

This invention features a device for controlling the operation of a pneumatic actuator and a pneumatic actuator having such a control device. More particularly, the actuator control device of the instant invention includes a housing mounted to an actuator end cap, a solenoid valve disposed within the housing and a gas control valve that controls the pressurized gas admitted to and exhausted from the actuator for valve actuation. The gas control valve is responsive to the solenoid valve and is mounted to the housing. Preferably, the control device includes a position indication mechanism, disposed within the housing, that determines a prespecified position of the valve responsive to the movement of at least one and preferably two moveable actuator probes extending from the actuator end cap into the housing. The gas control valve is a spool valve that is pneumatically controlled by the solenoid valve. The position indication mechanism includes a mechanical switch or an inductive proximity switch, one for each actuator probe that determines the position of an end of each actuator probe that are each actuated by an end of an actuator probe as it moves within the housing responsive to the motion of the actuator.

47 Claims, 5 Drawing Sheets

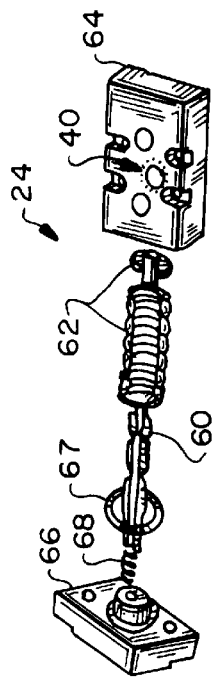
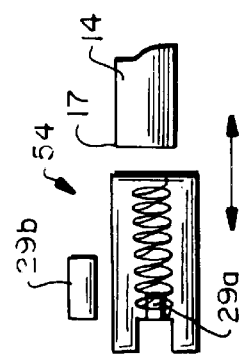
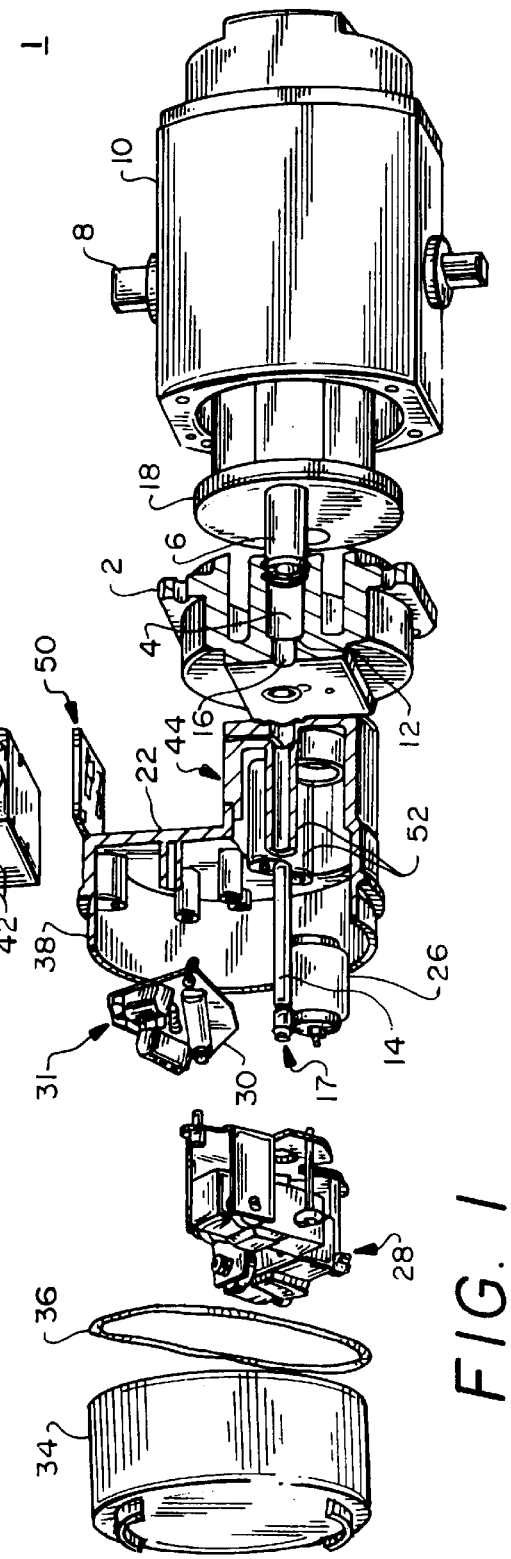
FIG. 3A
FIG. 3B
FIG. 1

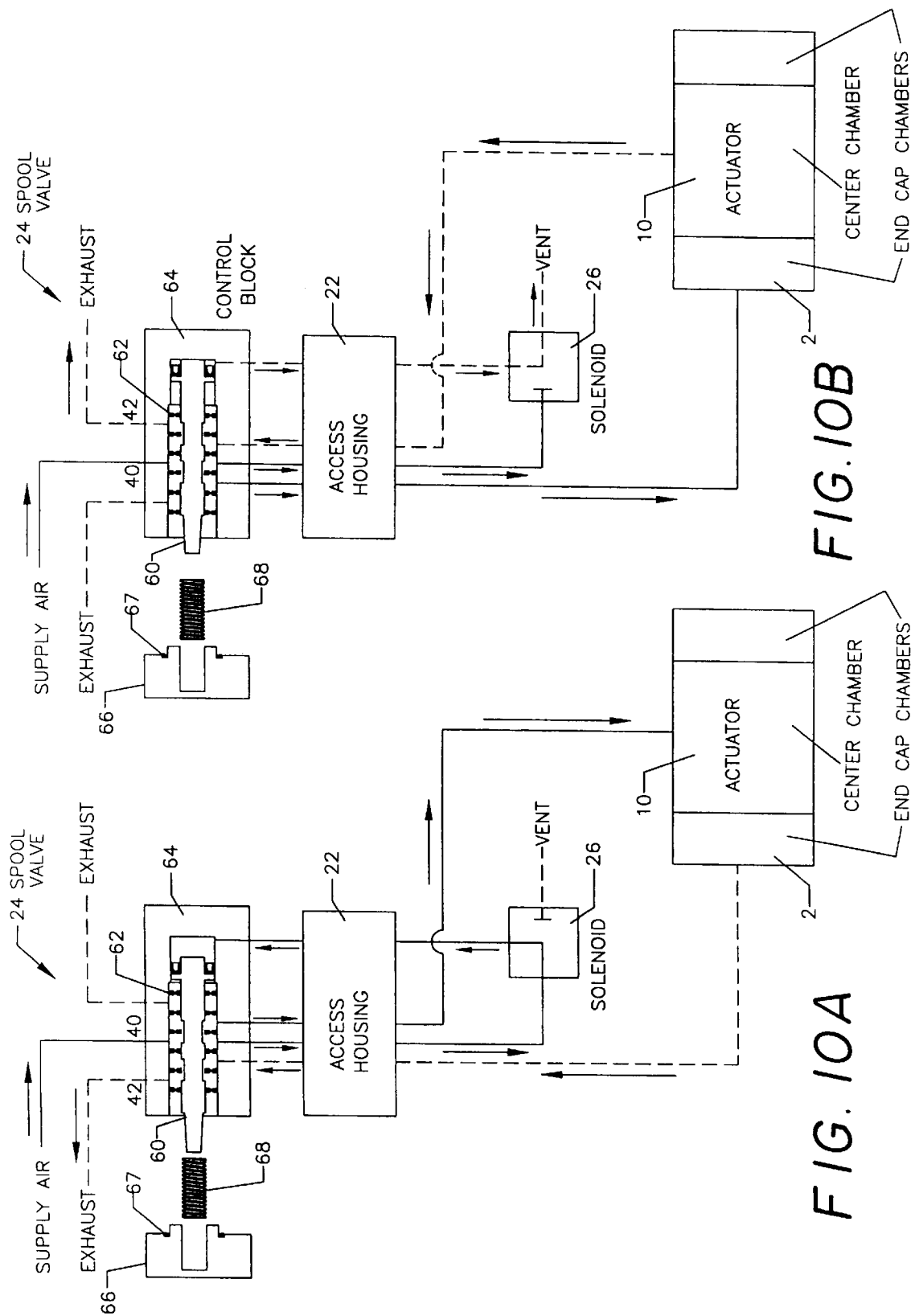

PNEUMATIC ACTUATOR HAVING AN END MOUNTED CONTROL DEVICE

FIELD OF THE INVENTION

This invention generally relates to single and double acting pneumatic actuators for valves and more particularly to single and double acting pneumatic actuators having a device, affixed to the actuator, that incorporates a means for controlling valve actuation and for determining valve position.

BACKGROUND OF THE INVENTION

In the operating facilities or plants found in the petrochemical and power industry, plant operators must have the ability to remotely control the operation of valves that are located throughout the plant from a main operating control room, from remote fixed control panels or from other locations remote from the locations of the valves. To accomplish this, some remotely controlled or remotely actuated valves are provided with pneumatic actuators that use a pressurized gas, such as pressurized air, as the energy source or the motive force to selectively position the valve in its open position, in its closed position or at some intermediate position.

The pneumatic actuator is typically a separate component that is attached or secured to the valve body and valve stem in such a fashion that the actuating mechanism will cause the valve stem to operate (e.g., causes valve stem to rotate) so as to cause the valve to change its position (i.e., cause the valve disc, plug or ball to stroke or move). In addition, it is common for the valve actuator to be provided with limit switches to sense the open/closed position of the valve as well as to interlock the valve actuator with other functions, as required, when the valve is in the open or closed position.

However, for these actuators the additional devices associated therewith such as the limit switches and the solenoid valve are individually constructed and each are separately mounted to the actuator. As such, special brackets must be designed and manufactured to secure each component to the actuator body. Additionally, the actuator must be designed with provisions or additional features so the brackets and components remain safely and properly secured to the actuator during the specified service conditions.

In addition to the mounting requirements, for on-site installation of these pneumatically actuated valves, the wiring providing power and control signals must be run to each separate device and an electrical termination made to each device. Further, there is typically, an electrical conduit or a flexible conduit and an associated connection for each electrical device mounted to the actuator particularly when there is a water or explosion proof design requirement imposed. Thus, the need for conduit and flexible connections for each electrical device, as well as the widely spaced wiring, makes installation of the pneumatic actuator expensive as well as creating a congestion of wiring and conduits proximate or about each pneumatic actuator.

The congested wiring, as well as the multiple conduit connections, makes maintenance of the pneumatic actuator and the related valve time consuming and expensive. For example, to remove a valve or its actuator each and every conduit connection and each and every electrical termination must be broken and the wiring and conduit/flexible conduit moved out of the way. Alternatively, the devices or components may be detached or disconnected from the actuator and left hanging from the conduit or wires while the actuator and/or valve is being removed/repaired.

Since the additional components (e.g., limit switches) are externally mounted to the actuator, each individual component must have a housing designed to meet the environmental or service conditions specified for the actuator. For example, if there was an explosion proof design requirement, each limit switch and solenoid valve mounted to the actuator would have to be constructed and designed to be explosion proof. As such, externally mounted components are generally more expensive because each component has to meet the rigorous design requirements of the actuator. In addition, this increases maintenance time and expense because these capabilities need to be maintained for each component (e.g., maintain explosion proof capability of each component housing). Generally components that are externally mounted to the actuator are also susceptible to damage, for example during installation or during maintenance activities.

There is, therefore, a need for a pneumatic actuator and an actuator controlling device that simplifies making electrical terminations and gas/air piping connections, which reduces the number of electrical conduits and which makes installation, operation and maintenance of the valve and actuator less expensive than for known pneumatic actuators. There is also a need for an actuator controlling device that simply and inexpensively can satisfy water and/or explosion proof design requirements as well as being a controlling device that can be simply and easily used for all size pneumatic actuators.

SUMMARY OF THE INVENTION

It is, therefore, an object of the present invention to provide a control device for a pneumatic actuator that incorporates the control mechanism for stroking or operating the valve and the mechanism that senses or determines valve position.

It is another object of the present invention to provide a control device adapted for mounting to a pneumatic actuator and which is configured so as to be used with various sized actuators.

It is a further object of the present invention to provide a control device for a pneumatic actuator that simplifies and reduces gas/air line and electrical conduit connections.

It is yet another object of the present invention to provide a control device for a pneumatic actuator having a water and explosion proof enclosure.

It is yet a further object of the present invention to provide a control device for a pneumatic actuator having low actuator cycle times.

It is still yet another object of the present invention to provide a pneumatic actuator that includes a control device of the instant invention.

It is still yet a further object of the present invention to provide a pneumatic actuator that includes a control device of the instant invention, where the actuator is compact in size and minimizes expenses for installation and maintenance.

This invention features a novel device for controlling the operation of a pneumatic actuator, which incorporates the control mechanism for interconnecting a pressurized gas source to the pneumatic actuator for stroking of a valve. This novel actuator control device further includes a position indication mechanism that determines a prespecified position of the valve. This invention also features a pneumatic actuator having such a novel actuator control device.

More particularly, the control device for a pneumatic actuator according to the present invention includes a housing, a solenoid valve disposed within the housing and a gas admission control valve removably mounted to the housing. The gas control admission valve is responsive to the solenoid valve and controls the pressurized gas admitted to the actuator for valve actuation. In a preferred embodiment, the actuator control device further includes a position indication mechanism, disposed within the housing, that determines a prespecified position of the valve responsive to the motion of the actuator.

Preferably, the gas admission control valve is a spool valve mounted to the housing and being pneumatically controlled by the solenoid valve so pressurized gas is selectively interconnected to the actuator thereby causing the valve to change position. The spool valve further includes a spool that is pneumatically controlled by the solenoid valve. In a specific embodiment, the spool valve further includes a spring that assists in moving the spool responsive to the solenoid valve's actions. For this embodiment, the spool is moved to one position, whereby the spring is compressed, by the solenoid admitting compressed gas/air into the spool valve. The spool is moved or returned to its other position in response to the action of the spring, when the solenoid vents the compressed gas/air from the spool valve.

When the actuator is a double acting actuator, the spool valve is configured so that in one position the spool interconnects the actuator to a pressurized gas source so the valve is opened and in a second position the spool interconnects the actuator to a pressurized gas source so the valve is closed. The spool is also positioned so portions of the actuator are vented while pressurized gas is being admitted to opposing portions of the actuator so as to selectively open or close the valve.

When the actuator is configured as single acting actuator, the actuator includes a plurality of springs that are disposed within the actuator body (e.g., outboard of the pistons) so as to act on the pistons. For this type of actuator, the spool valve is configured so that in one position, the spool interconnects the actuator to a pressurized gas source so the valve is moved to one position (e.g. open position) and the springs are compressed. In a second position, the spool is interconnected to the actuator so portions of the actuator are vented such that at least the springs move the actuator pistons and thereby move the valve to another position (e.g., valve closed). Alternatively, the pressurized gas/air source is interconnected to the actuator by the solenoid during such venting so the springs and the pressurized gas/air being admitted move the actuator pistons.

For one embodiment, the actuator further includes at least one actuator probe, extending from the actuator end cap into the housing, where the at least one actuator probe is selectively moveable responsive to motion of the actuator. For example, when the actuator is operated to open the valve, the actuator probe moves in one direction and when the actuator is operated to close the valve, the actuator probe is spring assisted to move in the opposite direction. The position indication mechanism determines the position of the valve responsive to the motion of the at least one actuator probe.

In a further embodiment, the position indication mechanism includes a switch assembly that is disposed within the housing in proximity to the area traversed by the at least one actuator probe as the probe moves responsive to the motion of the actuator. The switch assembly includes at least one probe sensor that determines the location of an end of the at least one actuator probe with respect to the switch assembly as it moves within the housing. The switch assembly provides one signal when the at least one probe sensor determines that the actuator probe end is at one position representative of the valve being opened. Another signal is provided by the switch assembly when the probe sensor determines the actuator probe end is at another position representative of the valve being closed.

In yet another embodiment, the actuator further includes two actuator probes, each of which extends from the actuator end cap into the device housing. Each actuator probe is selectively moveable responsive to motion of the actuator. For example, when the actuator is operated to open the valve, one actuator probe moves in one direction (e.g., outwardly) while the other actuator probe is spring assisted to move in the other direction (e.g., inwardly). The position indicator determines the position of the valve responsive to the motion of the actuator probes, in particular the position of the actuator probe end disposed within the device housing. For the two actuator probe embodiment, the position indicator includes a switch assembly having two probe sensors, each probe sensor being disposed in the housing proximate to the area being traversed by one of the actuator probes. The switch assembly provides a signal when one actuator probe end is at a position representative of the valve being opened and another signal when the end of the other actuator probe is at a position representative of the valve being closed.

Each probe sensor includes a mechanical switch or alternatively an inductive proximity switch. Preferably, each actuator probe and the switch assembly are arranged so movement of an actuator probe causes the corresponding mechanical or inductive proximity switch to be selectively actuated and de-actuated so the switch assembly respectively outputs the signal representative of the position of the valve. When the switch assembly is configured with a plurality of mechanical or inductive proximity switches, the signal being outputted by the switch assembly reflects the activation and preferably the deactivation of each switch (e.g., one switch activated and another deactivated) so the outputted signal is representative of the valve's position.

In further embodiments, the housing includes an aperture; a removable cover and a slide housing for each actuator probe. The aperture provides an opening or port for routing of the electrical wiring operating at least the solenoid valve and the position indication mechanism. The removable cover is provided so the components of the control device disposed within the housing are accessible for repair, maintenance and installation activities. Each actuator probe slide housing slidably receives an actuator probe extending from the actuator end cap and guides the probe as it slides towards and away from the switch assembly.

Also featured is a pneumatic actuator having a valve stroking mechanism that strokes the valve thereby changing the valve position and an actuator control device mounted to an end cap of the actuator. The actuator control device is as described above except that the spool valve controls the pressurized gas being admitted to the valve stroking mechanism to stroke the valve (i.e., change the valve's position).

In an embodiment, the valve stroking mechanism includes two guide rods, two pistons, and a rotatable shaft. The pistons each have at least one opposing surface, where one of the at least one opposing surface of each piston has spaced teeth thereon. Each guide rod is secured in one aperture of one of the pistons and slidably disposed in an aperture of the other piston.

The shaft has spaced teeth for engaging the teeth in the opposing surfaces of the pistons and the shaft is interconnected to the valve (i.e, valve stem) so rotation of the shaft causes the valve to change position. The spool valve, in one position, interconnects the pressurized gas source to the valve stroking mechanism so gas is admitted between the pistons while simultaneously exhausting pressurized gas from the area outboard of the pistons. This causes the pistons to move apart and the shaft to rotate in one direction.

The spool valve when placed in another position, interconnects the pressurized gas source to the valve stroking mechanism so gas is admitted outboard of the pistons while simultaneously exhausting pressurized gas from the area between the pistons. This causes the pistons to move towards each other and the shaft to rotate in another direction. In this way, the valve's position is changed by interconnecting the pressurized gas source to the appropriate area of the valve stroking mechanism, while simultaneously exhausting pressurized gas from the opposing area of the valve stroking mechanism.

In an alternate embodiment, the valve stroking mechanism includes springs to move the pistons in a given direction. For example, the springs are located outboard of the pistons so when the spool valve is positioned to vent the pressurized gas from the area between the pistons, at least the springs cause the pistons to travel inwardly or towards each other. When so positioned, the spool valve may also admit pressurized gas to the area outboard of the pistons so the pressurized gas/air being admitted and the springs move the pistons inwardly.

BRIEF DESCRIPTION OF THE DRAWING

FIG. 1 is a partial exploded view of a pneumatic actuator having a control device according to the instant invention;

FIG. 3A is an exploded view of the spool valve of FIGS. 1–2;

FIG. 3B is a partial schematic view of the switch assembly of FIGS. 1–2;

FIGS. 10A and 10B are flow diagrams illustrating the flow paths through the control device to and from the actuator for the valve opening and closing positions of FIGS. 9A and 9B, respectively.

DESCRIPTION OF THE PREFERRED EMBODIMENT

Figure 2:
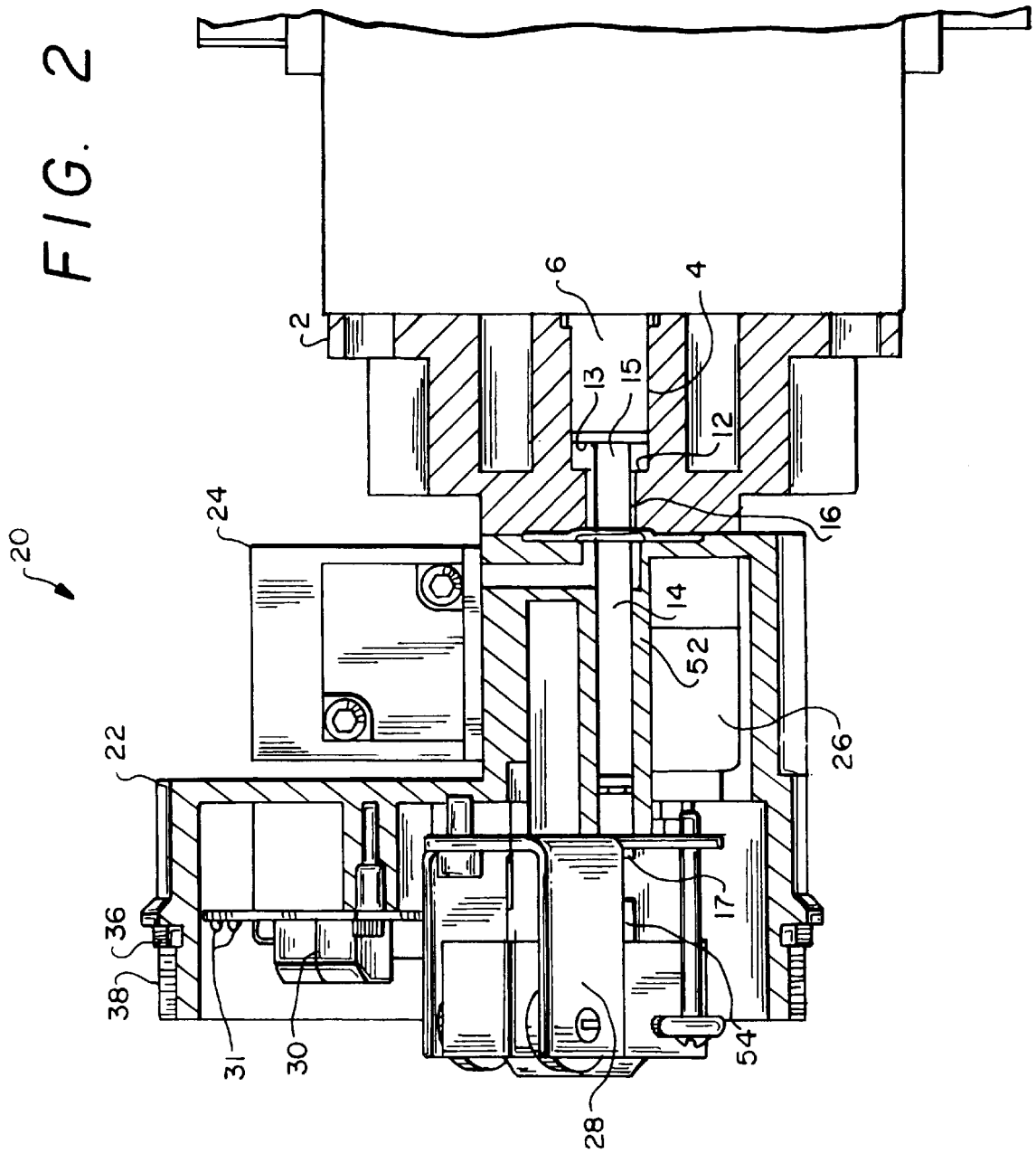
FIG. 2 is a partial side cut away view of the pneumatic actuator of FIG. 1.

There is shown in FIGS. 1–2, a partial exploded view and a partial cross sectional view of a pneumatic actuator 1, having a control device 20 according to the instant invention, for a valve (not shown) such as a ball valve, a plug valve, a butterfly valve or other ¼ turn valves. A valve generally is provided with a pneumatic actuator so the valve can be operated (i.e, open, closed or modulated) remote from the valve location (i.e., remotely operated). The actuator control device 20 of the instant invention is configured so the mechanism(s) used to control the pressurized gas/air, used to actuate the valve, and the mechanism(s) provided to sense and provide an indication of valve position are incorporated within the control device 20. In a particular embodiment, the actuator control device 20 includes a housing 22, a spool valve 24, a solenoid valve 26, and a circuit board 30 having a set of electrical terminals for wire termination. Preferably, the actuator control device 20 further includes a valve position indicating mechanism as hereinafter described.

The control device housing 22 is interconnected or mounted (e.g., bolted) to an end cap 2 of the actuator 1. The interior of the control device housing 22 is accessed by means of a housing end cover 34 that is secured to an end 38 of the control device housing, which end 38 is threaded (see FIG. 2). A cover seal 36 is disposed between the control device housing 22 and the housing end cover 34, as is known in the art, so the housing end cover 34 also forms a seal or pressure barrier when it is threadably secured to the control device housing 22.

The housing end cover 34 is threadably secured to the control device housing 22 so as to provide easy access to those components of the control device 20 located within the control device housing, such as the solenoid valve 26, the switch assembly 28 and the circuit board 30 as well as the electrical terminals or connections for these components. While a threaded connection is illustrated and described, this is not a limitation as any means known in the art (e.g., bolted or flanged connections) may be used to removably connect the housing end cover 34 to the control device housing 22.

The control device housing 22 also includes an electrical port 48 (FIG. 5) through which the electrical wiring, required to power and control the components of the actuator control device 20 (e.g., solenoid valve 26), is routed. Typically, the electrical port 48 is a threaded connection (e.g., ¾ in. NPT) to which a conduit or a flexible conduit connection is secured, however, the connection mechanism maybe any of number of means known in the art. When the conduit or flexible conduit is secured to the electrical port 48, the connection also establishes a local seal or barrier to the environment.

The seals formed by the housing end cover 34 and the threaded connection of the electrical port 48 seal the interior of the control device housing 22 thereby protecting the components located therein from the rigors of the environment to which the actuator and the valve are exposed. In this way, the control device housing 22, thus sealed, provides a sealed enclosure to protect the components of the actuator control device 20 located therein and more particularly to establish a water and/or explosion proof enclosure. Providing such a sealed enclosure, also allows components to be used that do not have to be designed or maintained to meet or satisfy the specific environmental design requirements for the actuator 1.

The control device housing 22 and the housing end cover 34 are typically constructed from a metal such as aluminum, however, other materials may be used, such as stainless steel or plastic. As described hereinafter, the end cover 34 also may be constructed so a portion or all of the end cover is transparent. The cover seal 36 is typically an "O" ring of BUNA material, although the cover seal 36 may be any means and material known in the art for providing a seal between the housing end cover 34 and the control device housing 22. In one embodiment, the control device housing 22 and the components comprising the actuator control device 20 of the instant invention are sized so the control device can be mounted to any size actuator.

Located within the control device housing 22, near the housing end cover 34, is a solenoid valve 26 that controls the operation of the spool valve 24. The solenoid valve 26 is a pilot solenoid valve that has a low power requirement and in an exemplary embodiment is a Honeywell/Skinner 3931BJA7EN00. Since the solenoid valve 26 is within the sealed environment (i.e., sealed enclosure) of the control device housing 22 and housing end cover 34, a general purpose type of solenoid valve is used in the instant invention for the many different type of environments to which the actuator could be subjected. This is an advantage over known actuator solenoids which, because they are externally mounted, are more costly to make and maintain since they are generally designed to the more severe design requirements specified for an actuator or valve (e.g., explosion proof housing). The solenoid valve 26 is accessed for installation and maintenance by removing the housing end cover 34 as discussed hereinafter concerning FIGS. 6, 7.

The spool valve 24 is secured to a mounting surface 44 on the outside surface of the control device housing 22 by means of bolting and a gasket 50. The spool valve mounting surface 44 includes gas/air and vent ports that interconnect the spool valve 24 to gas/air lines and passages that are internal to the control device housing 22, the actuator end cap 2 and the actuator body 10. Since the spool valve 24 is mounted directly to the control device housing 22, there are no external gas/air pipe lines or tubing, which interconnect the spool valve 24 and solenoid valve 26 or which interconnect the spool valve 24 and the actuator end cap and body 2, 10, that can become damaged or disconnected.

Referring also to FIG. 3A, the spool valve 24 preferably includes a spool 60, spool seals 62, a main valve block 64, an end valve block 66, an O-ring 67, and a spring 68. When assembled, the end and main valve blocks 64,66 are secured to each other by bolting (not shown) to form a cylindrical chamber therein. The joint between the end and main valve blocks 64,66 is sealed by means of the O-ring 67. The spool 60 is located within the cylindrical chamber and is sealingly spaced from the longitudinally extending surface of the cylindrical chamber by means of the spool seals 62.

Preferably, the spool valve 24 and more particularly the spool 60 is pneumatically controlled or operated by the solenoid valve 26. Since the spool valve 24 is being pneumatically controlled, a low power solenoid may be used to control the spool valve. In a preferred embodiment, the spool valve 24 is a high flow spool valve as is known in the art, so as to provide the pneumatic actuator with low actuator cycle times.

To move the spool 60 to one position, gas/air is admitted by the solenoid valve 26 to pressurize one end of the spool valve cylindrical chamber while the other end of the cylindrical chamber or bore is vented. The pressurization/venting causes the spool 60 to slide longitudinally in the cylindrical chamber to the desired position and thereby compress the spring 68. The spool 60 when so positioned directs the gas flow internal to the control device housing 22, actuator end cap 2 and actuator body 10 to move the pistons 18 to the desired position as more fully discussed in connection with FIGS. 8A,B.

To move or return the spool to its other or initial position, the solenoid valve 26 vents the pressurized end of the cylindrical chamber. The spring 68 relaxes causing the spool 60 to slide longitudinally to the initial position. In this way, the spool valve 24 functions as a type of spring assisted four way valve that controls the pressurized gas/air being admitted and the gas/air being exhausted or vented from the actuator 1 and thereby controls the actuation of the valve connected to the actuator 1. For example, when the spool 60 is slid to one position (e.g., its initial position), pressurized gas is admitted into the appropriate chamber of the actuator 1 and simultaneously exhausted from the opposing chamber. This causes the valve to go from the open to the closed position.

The main valve block 64 of the spool valve 24 is configured with an inlet port 40 and two exhaust ports 42. The exhaust ports 42 may be adjustable for speed control. The inlet port 40 is connected to the piping and/or tubing (not shown) from a pressurized gas source, such as pressurized air, as well as being connected to the spool valve 24 and the solenoid valve 26. In this way, the solenoid valve 26 has a source of pressurized gas/air to operate the spool valve 24. Correspondingly, the spool valve 24 has a pressurized gas/air source to operate the actuator 1 (e.g., the pistons 18) as herein described. The exhaust ports 42 typically are not interconnected to discharge piping and or tubing, but rather exhaust directly to the atmosphere.

Since the piping and/or tubing from the pressurized gas source is connected to the spool valve main valve block 64, maintenance activities for the solenoid valve 26 and the spool valve 24, not involving removal of the spool valve from the housing mounting surface 44, are simplified. In addition, the potential for damage to the end connection of the gas source piping or tubing is minimized since the connection between the gas source piping/tubing and the inlet port 40 does not have to be broken to repair or replace the solenoid valve 26 or to repair the spool valve 24 (e.g., main and end valve blocks 64,66 can be separated to maintain the spool 60 and/or spool seals 62).

Referring back to FIGS. 1–2, also located within the control device housing 22 near the housing end cover 34 is the circuit board 30. The circuit board 30 includes the circuitry and electrical components necessary for providing at least the power to operate the solenoid valve 26 and the valve position indicating mechanism as well as providing the control signals to or from the solenoid valve 26 and the valve position indicating mechanism. The circuit board 30 also includes a set of electrical terminals to which the external power and control wiring are interconnected. The circuit board 30 and the electrical terminals are accessed for installation and maintenance by the removing the housing end cover 34 as discussed hereinafter concerning FIGS. 6, 7.

Figure 6:
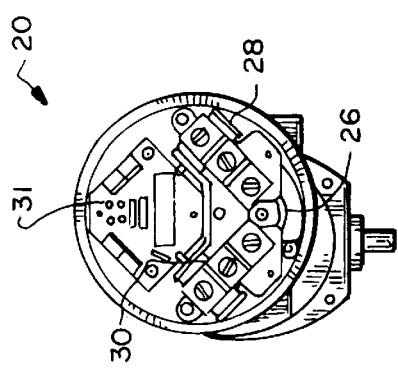
FIG. 6 is an end view of the pneumatic actuator of FIG. 4 without an end cover installed.

In a further embodiment, the circuit board 30 includes a plurality of light emitting diodes (LEDs) 31, as more clearly illustrated in FIG. 6, and includes the circuitry for operating the LEDs 31. These LEDs 31 provide a mechanism by which a user can visually determine if a problem exists with the operation of the valve, actuator and/or components of the actuator control device 20 of the instant invention. It is within the scope of the instant invention for the circuit board 30, or the actuator control device 20, to be configured with any other means known in the art (e.g., liquid crystal displays) that can provide a visual indication of a characteristic to be monitored such as valve closure status.

In one embodiment the circuit board 30 is configured with four LEDs 31, two LEDs provide an indication of valve position and the other two LEDs provide an indication of the operation of the solenoid valve 26. Preferably, each of the LEDs 31 is a different color when energized so a user can visually determine valve position and operation status of the solenoid valve 26. In an exemplary embodiment, one LED is colored red when energized to indicate valve closure and another LED is colored green to indicate an open valve. The third and fourth LEDs are respectively colored amber and yellow to indicate respectively the presence of solenoid coil current and voltage. Thus, for example, if only the yellow and amber LEDs were lit, the user could visually determine that a problem exists with the valve since there is no indication that the valve is either closed or open (i.e., no red or green LED lit).

The LEDs 31 are visually observable when the end cover 34 is removed as shown in FIG. 6. Alternatively, at least a portion of the end cover 34 is constructed so as to include a transparent material or the entire end cover is constructed from such a material. In this way, the LEDs 31 are observable through the transparent material while the end cover 34 is sealingly secured to the control device housing 22.

Figure 8A:
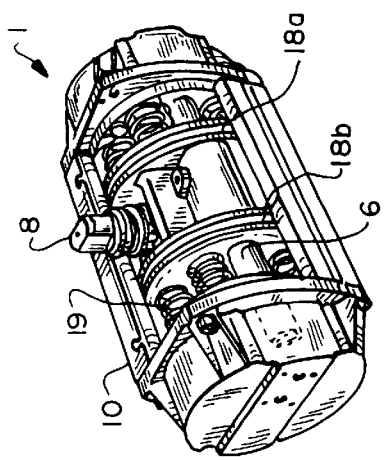
FIGS. 8A,B are cut away views of primarily the body for single acting and double acting actuators.

To best understand the valve position indicating mechanism, the operation of the actuator 1 is first discussed with reference to FIGS. 8A,B and also with reference to FIGS. 1–3 for those components not specifically shown in FIGS. 8A,B. There is shown in FIG. 8A, a single acting pneumatic actuator 1 having a body 10 and disposed therein two pistons 18a,b; two guide rods 6, and a plurality of springs 19 disposed outboard of the pistons 18a,b. One guide rod 6 is secured to a first piston 18a and is slidably inserted into an aperture in the second piston 18b. Conversely, the other guide rod 6 is secured to the second piston 18b and slidably disposed in the first piston 18a. Each piston 18a,b also includes gear teeth that engage corresponding gear teeth on the actuator shaft 8 so the actuator shaft rotates when the pistons move longitudinally inside the actuator body 10. Since the valve shaft (not shown) is interconnected to the actuator shaft 8, the rotation of the actuator shaft causes the valve to change its position (e.g., valve goes from open to closed).

Figure 9B:
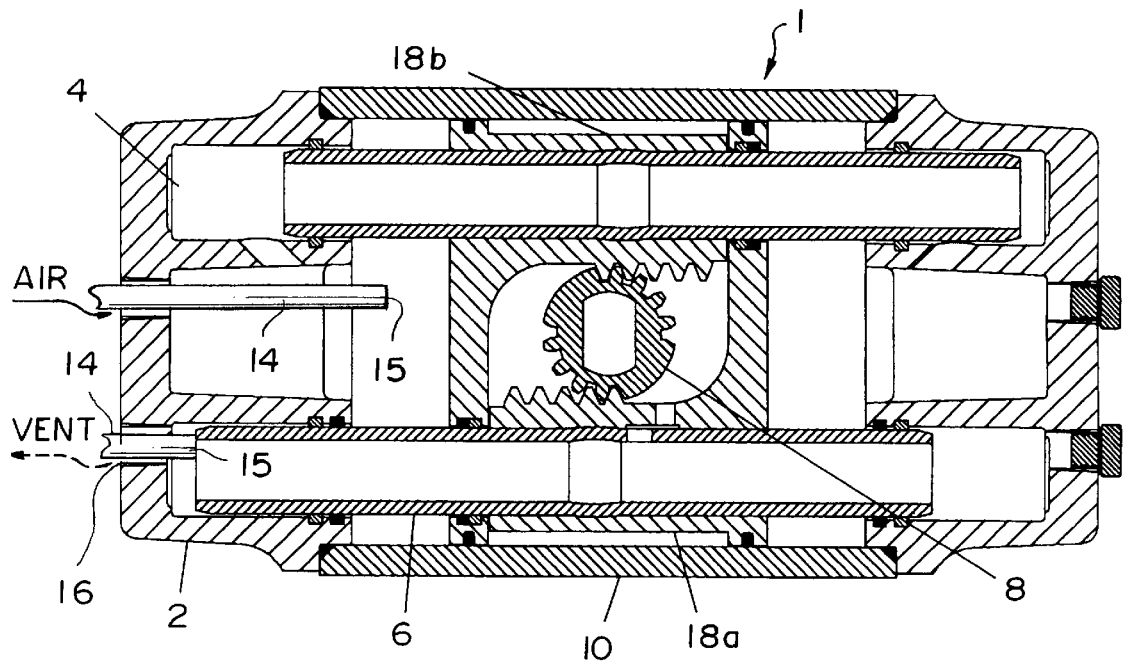
FIGS. 9A and 9B are sectional views of the actuator and end cap illustrating the valve opening and closing positions of the double acting actuator of FIG. 8B.
Figure 9A:
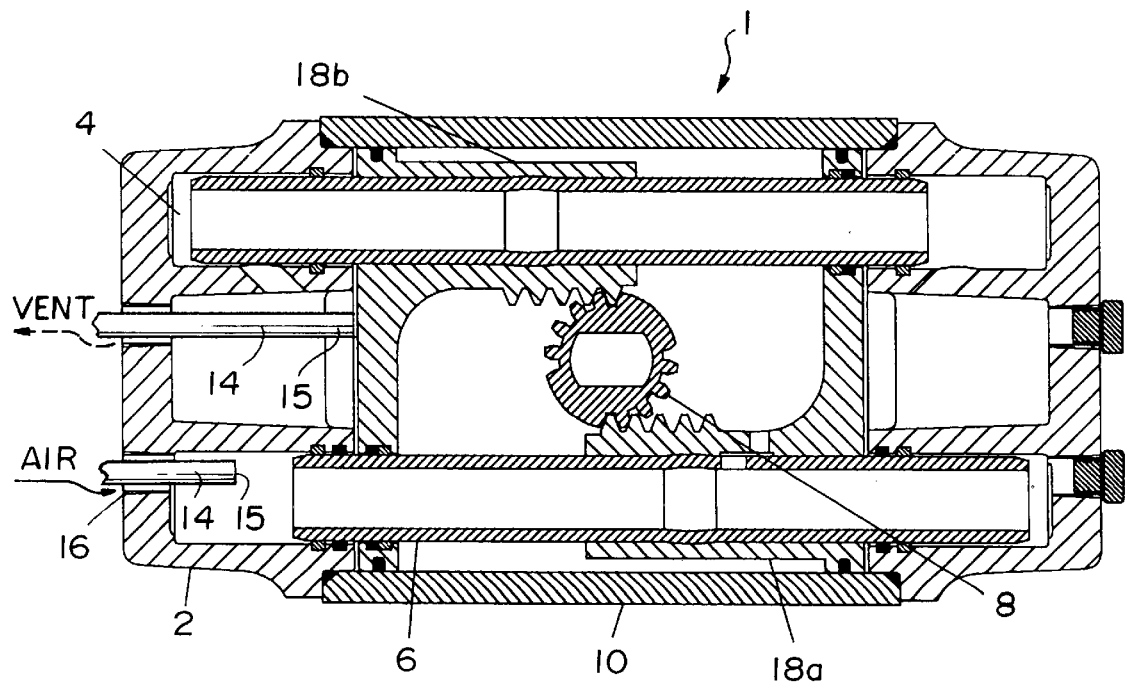

The pistons 18a,b are moved outward (i.e., away from each other) by admitting pressurized gas/air into the cavity or chamber formed between the pistons 18a,b and exhausting or venting gas/air from the area outside of the pistons. In the instant invention, the spool valve 24 is positioned by the solenoid valve 26 so the inlet port 40, and correspondingly the pressurized gas/air source, are connected to the internal ports and gas/air lines that feed the area between the pistons 18a,b. The spool valve 24, so positioned, also causes the ports and gas/air lines in fluid communication with the area outside or outboard of the pistons 18a,b to be connected to one of the exhaust ports 42 so gas/air is exhausted or vented out of this area as illustrated in FIGS. 9A and 10A. The outward motion of the pistons 18a,b causes the actuator shaft 8 to rotate in one direction and also compresses the plurality of outward mounted springs 19.

Conversely, when the pistons 18a,b move inwardly or towards each other, the actuator shaft 8 is rotated in the opposite direction. To accomplish this, the spool valve 24 is positioned by the solenoid valve 26 and the spring 68 so the ports and gas/air lines in fluid communication with the chamber between the pistons 18a,b are connected to the other of the exhaust ports 42 for venting of gas/air out of this area as illustrated in FIG. 10B. The plurality of compressed springs 19 then can relax, thereby causing the pistons 18a,b to move inwardly. Alternatively, pressurized gas/air is admitted to the area outboard of the pistons 18a,b while venting so the springs 19 and the pressurized gas/air move the pistons inwardly as described below for the embodiment without springs. The springs also may be arranged so the pistons 18a,b move outwardly in response to the above described pressurization and venting.

Figure 8B:
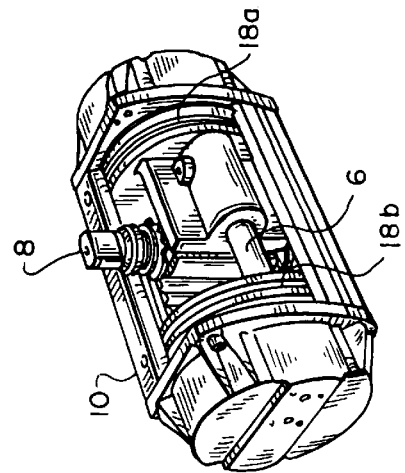

For a double acting actuator, as shown in FIG. 8B, there are no outboard mounted springs to move the pistons 18a,b inwardly. Rather the spool valve 24, when it is positioned to vent gas/air from between the pistons, is also positioned so the inlet port 40 and the pressurized gas source are connected to the internal ports and gas/air lines that feed the area outboard of the pistons 18a,b as illustrated in FIGS. 9B and 10B. This pressurization and venting causes the pistons 18a,b to travel inwardly, thereby rotating the actuator shaft 8.

Typically, there are mechanical stops provided with the actuator 1 that limit the travel of the pistons 18a,b in either direction. Also, each guide rod 6 is preferably made from stainless steel and each piston 18a,b is preferably aluminum. The guide rod 6 and pistons 18a,b, however, may be made from any material that has the required strength for the intended application including plastics.

Referring back to FIGS. 1–2, there is provided at least one, and preferably two through apertures 16 in the actuator end cap 2 that are each aligned with a switch probe slide housing 52 in the control device housing 22 when the housing 22 is secured to the actuator end cap 2. Each aperture 16 and switch probe slide housing 52 are aligned so as to slidably receive a switch probe 14. In an exemplary embodiment, the switch probe 14 is a cylindrical metal rod such as a nickel plated carbon steel rod. The switch probe 14, however, may be made from any material and may be configured with any geometric shape appropriate for the described application and function.

In one embodiment, each through aperture 16 is located in the end 12 of a guide rod slide housing 4 so a first end 15 of each switch probe 14 is slidably disposed within the guide rod slide housing 4 and so the second end 17 of the switch probe 14 is disposed within the control device housing 22. Thus, when the end 13 of one guide rod 6 moves towards the end 12 of its guide rod slide housing 4, responsive to the motion in one direction of the pistons 18 (e.g., away from each other), the rod end 13 contacts the switch probe first end 15.

Thereafter, the continued motion of the guide rod 6 causes the switch probe 14, and in particular the switch probe second end 17, to slide or move in an outward direction towards the switch assembly 28 (i.e., away from actuator end cap 2). As hereinafter described, since the guide rods 6 move asynchronously the second end 17 of the other switch probe 14 correspondingly moves away from the switch assembly 28 towards the actuator end cap 2. When the pistons 18 are moved in the opposite direction (e.g., towards each other), the second ends 17 of the switch probes 14 reverse their respective positions (e.g., switch probe 14 closest to switch assembly 28 moves away from it).

In an alternative embodiment, a through aperture 16 is located in the end cap 2 so the first end 15 of the switch probe 14 is acted upon by one piston 18 in a fashion similar to that described for a guide rod 6. Thus, the second end 17 of the switch probe 14 moves back and forth responsive to the motion of the piston 18. This back and forth motion is asynchronous with the second end 17 of the other switch probe 14. Such an arrangement may be used when the control device 20 of the instant invention is a designed so one device housing 22 is sized to fit all sized actuators 1.

In yet another embodiment, the control device 20 is configured with a single switch probe 14. For this embodiment, the switch probe first end 15 is acted upon by a piston 18 or guide rod 6 in the manner described in the foregoing. As such, the switch probe second end 17 moves outwardly towards the switch assembly 28 when the piston 18 or guide rod 6 moves in one direction. Correspondingly, when the piston or guide rod move in the other direction, the switch probe second end 17 moves away from the switch assembly. As also described in the foregoing, the end cap 2 includes a through aperture 16, that slidably receives the switch probe 14.

Referring also to FIG. 3B, as a switch probe second end 17 moves outwardly, the second end contacts a spring loaded cap assembly 54 of the switch assembly 28 that includes a cap and spring disposed therein. The continued outwardly movement of the switch probe second end 17, responsive to the motion of the guide rod 6 or piston 18, depresses the cap and compresses the spring disposed therein. When the guide rod 6 or piston 18 stops moving, the guide rod 6 or piston 18 keeps the cap and spring of the spring loaded cap assembly 54, respectively depressed and compressed, acting essentially like a mechanical stop.

As indicated above, when the pistons 18 are moved in the opposite direction (e.g., towards each other), the end 13 of the guide rod 6 moves away from the end 12 of its guide rod slide housing 4 or the piston moves away from the end cap. This motion of the piston 18 or the guide rod 6 allows the spring within the spring loaded cap assembly 54 to relax which in turn urges the switch probe 14 away from the switch assembly 28. Thus, the motion of a switch probe(s) 14 is representative of the motion of the pistons 18 and thus the motion of the actuator 1.

The above described mechanism for causing each switch probe 14 to move away from the switch assembly 28 is exemplary as there are a number of ways known in the art for causing the switch probe 14 to be selectively positioned or repositioned responsive to the motion of a guide rod 6 and/or a piston 18. For example, a spring may be disposed within a guide rod slide housing 4 and the first end 15 of a switch probe 14 may be configured so it is acted upon by the spring. In this way, the motion of the guide rod 6 in one direction compresses the spring and the motion of the guide rod 6 in the opposite direction allows the spring to act on the switch probe first end 15 causing it to move away from the guide rod slide housing end 12.

In one embodiment, the switch assembly 28 is configured with at least one mechanical switch 29a, such as a Honeywell micro BZ series. Preferably, the switch assembly 28 is configured with two mechanical switches. Alternatively, the switch assembly 28 is configured with at least one inductive proximity switch 29b and preferably two inductive proximity switches, such as a MICRO #923FS4-A7T-BZ. The number of switches being provided corresponds to the number of switch probes 14 of the actuator 1. Each mechanical or inductive proximity switch 29a,b is mounted in the switch assembly proximal to a spring loaded cap assembly 54 and each switch is responsive to the motion of the corresponding switch probe second end 17.

The mechanical switch 29a is activated when the cap of the spring loaded cap assembly 54 is depressed a prespecified amount by the switch probe second end 17. In an exemplary embodiment, the depressed cap actuates a button type of mechanical switch 29a disposed within the cap. For an inductive proximity switch 29b, the switch probe second end 17 causes the corresponding inductive proximity switch to be actuated after the cap of the spring loaded cap assembly 54 is similarly depressed a prespecified amount (i.e., switch probe second end 17 is in proximity to inductive proximity switch 29b).

When the switch assembly 28 is configured with two mechanical or inductive proximity switches, the actuation of each switch, by its corresponding switch probe second end 17 causes the switch assembly 28 to output a signal that is representative of the specific switch being actuated. Similarly, when the switch assembly is configured with a single mechanical or inductive proximity switch a signal is outputted when the switch is actuated by the switch probe second end 17. For single switch assemblies, when the switch probe 14 is moved away from the switch assembly 28 by action of the spring loaded cap assembly 54 (e.g., by action of the spring), the signal from the switch assembly 28 is changed or terminated by action of the mechanical or inductive proximity switch. In this way, the signals from the switch assembly 28, of either switch assembly embodiment, are representative of the position of the pistons 18 within the actuator 1 and correspondingly the position of the valve.

Each switch probe second end 17 may be configured with a magnetic tip or other material so as to increase the sensing ability of the inductive proximity switch. For example, a permanent ceramic magnet in a molded plastic carrier may be affixed to the switch probe 14 at its second end 17.

Figure 4:
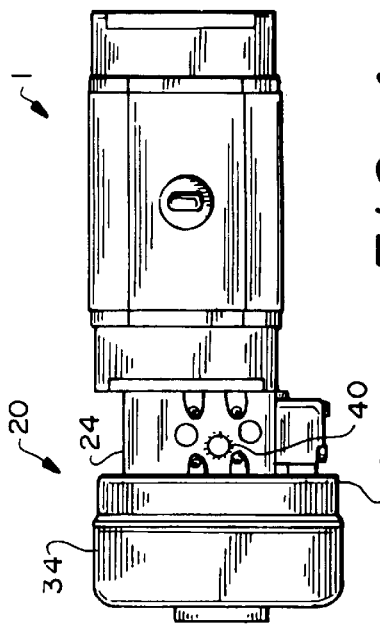
FIG. 4 is a top view of a pneumatic actuator having a control device of the instant invention.
Figure 5:
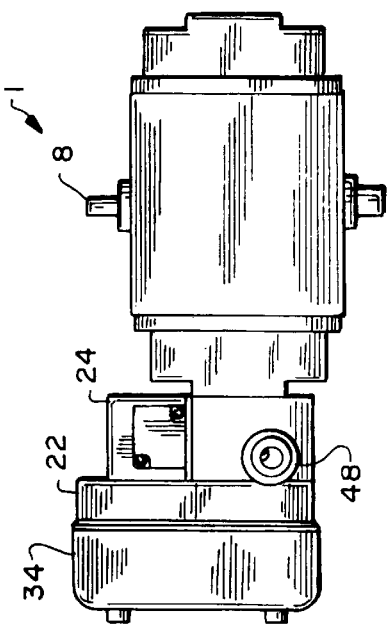
FIG. 5 is a side view of the pneumatic actuator of FIG. 4.

Referring to FIGS. 4–5, there is shown top and side views respectively of a pneumatic actuator 1 having an actuator control device 20 according to the instant invention. Since the solenoid valve 26 and switch assembly 28 are located within the control device 20, the actuator 1 of the instant invention is compact in comparison to known pneumatic actuators which have the solenoid valve and limit switches mounted external to and extending outward from the actuator body. This also eliminates the need for special mounting brackets and/or couplings for these components as well as eliminating the need to design the actuator body for these brackets.

Since the related components of the instant invention are located within the actuator control device 20 the need for separate electrical conduits and wiring runs to feed power and control signals to each of these components is also eliminated. Instead, the wiring is run to a single electrical port 48 and electrical termination is accomplished within the control device 20. This simplifies installation and maintenance as well as reducing the congestion created by the multiple conduit/wiring runs that feed the separately mounted limit switches and solenoid valve of known actuators.

Figure 7:
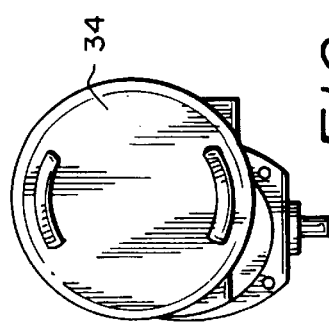
FIG. 7 is an end view of the pneumatic actuator of FIG. 4 with the end cover installed.

As shown in FIG. 6, the interior of the actuator control device 20 is accessed by removing the housing end cover 34 (not shown), which exposes the solenoid valve 26, the switch assembly 28, and the circuit board 30 including the LEDS 31. Also exposed are the associated electrical connections or terminations. These components can be removed, repaired and replaced while the housing end cover 34 is off as well as performing any related electrical terminations to the electrical connections. After the work is completed, the housing end cover 34 is simply reconnected (e.g., screwed back on) to the device housing 22, as shown in FIG. 7, which in conjunction with the end cover seal 36 (FIG. 1) re-establishes the integrity of the housing 22 for the actuator control device 20 (e.g., re-establishes a water/explosion proof housing).

Since these components are located internal to the control device housing 22 (FIG. 5), there is no need to break the sealed conduit connection to the electrical port 48 (FIG. 5) to remove a component for example a solenoid valve 26 for maintenance. In contrast, for known actuators having externally mounted limit switches and solenoid valve, repair work typically does involve breaking and re-establishing the sealed conduit connections to the individual component.

Similarly since the solenoid valve 26 is internal to the control device housing 22, there is no need to break the gas/air line(s) connected to or feeding the spool valve 24 of the actuator 1, whereas this would be required for externally mounted solenoid valves of other actuators.

While a preferred embodiment of the invention has been described using specific terms, such description is for illustrative purposes only, and it is to be understood that changes and variations may be made without departing from the spirit or scope of the following claims.

What is claimed is:

1. A device for controlling the operation of a pneumatic actuator and thereby controlling the selective actuation of a remote valve, said actuator control device comprising:
    an end cap adapted for mounting to the pneumatic actuator;
    a housing connected to said end cap;
    a solenoid valve mounted to said housing;
    a gas admission control valve to control the pressurized gas admitted to and exhausted from the actuator for remote valve actuation, said gas admission control valve being mounted to said housing and being responsive to said solenoid valve, and,
    a valve position mechanism mounted to said housing for determining a prespecified position of the remote valve responsive to motion of the actuator.

2. The pneumatic actuator control device of claim 1,
    wherein said solenoid valve and said valve position mechanism are mounted in said housing, and
    wherein said housing includes an aperture for electrical wiring for operating said solenoid valve and said valve position mechanism.

3. The pneumatic actuator control device of claim 1,
    wherein said solenoid valve and said valve position mechanism are mounted in said housing, and
    wherein said housing includes a removable cover to access components of the pneumatic actuator control device mounted in said housing.

4. The pneumatic actuator control device of claim 1, further comprising at least one actuator probe extending into said housing and being selectively moveable responsive to motion of the actuator, and wherein said valve position mechanism is responsive to the motion of said at least one actuator probe.

5. The pneumatic actuator control device of claim 4, wherein said housing includes a passage for slidably receiving the at least one actuator probe; wherein said valve position mechanism includes at least one probe sensor disposed within said housing in proximity to said passage; and wherein said at least one probe sensor determines the position of an end of the at least one actuator probe as the at least one actuator probe slides within said passage.

6. The pneumatic actuator control device of claim 5, wherein said valve position mechanism provides one signal when said probe sensor determines that the end of the at least one actuator probe is at one position representative of the remote valve being opened and wherein said valve position mechanism provides another signal when said probe sensor determines that the probe end is at another position representative of the remote valve being closed.

7. The pneumatic actuator control device of claim 5, wherein said probe sensor includes an inductive proximity switch to sense the end of the at least one actuator probe.

8. The pneumatic actuator control device of claim 5, wherein said probe sensor includes a mechanical switch that is activated by the end of the at least one actuator probe.

9. The pneumatic actuator control device of claim 4, comprising two actuator probes each extending into said housing and each actuator probe being selectively moveable responsive to the motion of the actuator, and wherein said valve position mechanism provides an output signal representative of one position of the remote valve by determining the position of an end of one actuator probe and provides an output signal representative of another position of the remote valve by determining the position of an end of the other actuator probe.

10. The pneumatic actuator control device of claim 1, further comprising at least one visual indicating mechanism for providing a visual indication of at least the position of the remote valve in response to a signal from said valve position mechanism.

11. The pneumatic actuator control device of claim 10 comprising a plurality of visual indicating mechanisms, at least one of which provides said visual indication of the position of the remote valve, and at least another of which provides a visual indication of the operation of the solenoid valve.

12. The pneumatic actuator control device of claim 1, wherein said end cap and said housing are separate pieces and said housing is adapted for mounting to said end cap.

13. A device for controlling the operation of a pneumatic actuator and thereby controlling the selective actuation of a remote valve, said actuator control device comprising:
    an end cap adapted for mounting to the pneumatic actuator;
    a housing connected to said end cap;
    a solenoid valve mounted to said housing; and,
    a gas admission control valve to control the pressurized gas admitted to and exhausted from the actuator for remote valve actuation, said gas admission control valve being a spool valve removably mounted to said housing and pneumatically controlled by said solenoid valve so pressurized gas is selectively inter-connected to the actuator thereby causing the remote valve to change position.

14. The pneumatic actuator control device of claim 13,
    wherein the pneumatic actuator is a double acting actuator;
    wherein said spool valve includes a spool pneumatically controlled by said solenoid valve, such that in one position said spool interconnects the actuator to a pressurized gas source so the remote valve is opened and in a second position said spool interconnects the actuator to the pressurized gas source so the remote valve is closed; and
    wherein said pneumatically controlled spool simultaneously exhausts gas from a portion of the actuator while admitting pressurized gas to another portion of the actuator so the remote valve is selectively opened and closed.

15. The pneumatic actuator control device of claim 13, wherein the pneumatic actuator includes a plurality of springs, and wherein said spool valve includes a spool pneumatically controlled by said solenoid valve, such that in one position said spool interconnects the actuator to a pressurized gas source so the remote valve is moved to one position and in a second position said spool vents gas from a portion of the actuator so at least the springs cause the remote valve to move to another position.

16. The pneumatic actuator control device of claim 15, wherein said spool when in the second position admits pressurized gas to an opposing portion of the actuator while venting gas from the actuator so the pressurized gas being admitted and the springs cause the remote valve to move.

17. The pneumatic actuator control device of claim 13, wherein said spool valve is mounted to said housing so said spool valve is in fluid communication with ports in said housing that are in fluid communication with areas in the actuator for selectively changing the position of the remote valve.

18. The pneumatic actuator control device of claim 13, wherein said end cap and said housing are separate pieces and said housing is adapted for mounting to said end cap.

19. The pneumatic actuator control device of claim 13 further comprising at least one visual indicating mechanism for providing a visual indication of at least the position of the remote valve in response to a signal from said valve position mechanism.

20. A device for controlling the operation of a pneumatic actuator and thereby the selective actuation of a remote valve, said pneumatic actuator control device comprising:
    an end cap adapted for mounting to the pneumatic actuator,
    a housing connected to said end cap;
    two actuator probes, each probe extending into said housing and being selectively moveable responsive to motion of the actuator, and said housing including two passages each for slidably receiving a corresponding one of the actuator probes;
    a solenoid valve mounted to said housing;
    a spool valve mounted to said housing and pneumatically controlled by said solenoid valve so pressurized gas is selectively interconnected to the actuator thereby causing the remote valve to change position; and,
    a valve position mechanism mounted to said housing and including two probe end sensors, each probe sensor being proximal to a corresponding housing passage to determine a position of an end of a corresponding actuator probe,
    and wherein said valve position mechanism provides one signal when one of said probe end sensors determines that the end of the corresponding actuator probe is at a position representative of the remote valve being opened, and wherein said valve position mechanism provides another signal when the other probe end sensor determines that the end of the corresponding other actuator probe is at a position representative of the remote valve being closed.

21. The pneumatic actuator control device of claim 20, wherein each said probe end sensor includes an inductive proximity switch to sense the end of the corresponding actuator probe.

22. The pneumatic actuator control device of claim 20, wherein each probe end sensor includes a mechanical switch that is activated by the corresponding actuator probe.

23. The pneumatic actuator control device of claim 20,
    wherein the pneumatic actuator is a double acting actuator;
    wherein said spool valve includes a spool pneumatically controlled by said solenoid valve, such that in one position said spool interconnects the actuator to a pressurized gas source so the remote valve is opened and in a second position said spool interconnects the actuator to the pressurized gas source so the remote valve is closed; and
    wherein said pneumatically controlled spool simultaneously exhausts gas from a portion of the actuator while admitting pressurized gas to another portion of the actuator so the remote valve is selectively opened and closed.

24. The pneumatic actuator control device of claim 20, wherein the pneumatic actuator further includes a plurality of springs, and wherein said spool valve includes a spool pneumatically positioned by said solenoid valve, such that in one position said spool interconnects the actuator to a pressurized gas source so the remote valve is moved to one position and in a second position said spool vents gas from a portion of the actuator so at least the springs cause the remote valve to move to another position.

25. The pneumatic actuator control device of claim 20, wherein said spool valve is mounted to said housing so said spool valve is in fluid communication with ports in said housing that are in fluid communication with areas in the actuator for selectively changing the position of the remote valve.

26. The pneumatic actuator control device of claim 20,
    wherein said solenoid valve and said valve position mechanism are mounted in said housing, and
    wherein said housing includes a removable cover to access components of the pneumatic actuator control device mounted in said housing.

27. The pneumatic actuator control device of claim 20, wherein said end cap and said housing are separate pieces and said housing is adapted for mounting to said end cap.

28. The pneumatic actuator control device of claim 20 further comprising at least one visual indicating mechanism for providing a visual indication of at least the position of the remote valve in response to a signal from said valve position mechanism.

29. The pneumatic actuator control device of claim 28 comprising a plurality of visual indicating mechanisms, at least one of which provides said visual indication of the position of the remote valve, and at least another of which provides a visual indication of the operation of the solenoid valve.

30. A pneumatic actuator for selectively actuating a remote valve, said pneumatic actuator comprising:
    a valve stroking mechanism for stroking the remote valve to thereby change a valve position;
    an actuator body for carrying said stroking mechanism;
    an end cap adapted for mounting to said actuator body;
    a housing connected to said end cap of the pneumatic actuator;
    a solenoid valve mounted to said housing;
    a spool valve mounted to said housing and pneumatically controlled by said solenoid valve so pressurized gas is selectively interconnected to said valve stroking mechanism so as to cause the remote valve to change position; and,
    a valve position mechanism mounted to said housing for determining a prespecified position of the remote valve responsive to said valve stroking mechanism.

31. The pneumatic actuator of claim 30,
    wherein said solenoid valve and said valve position mechanism are mounted in said housing, and
    wherein said housing includes an aperture for electrical wiring for operating said solenoid valve and said valve position mechanism.

32. The pneumatic actuator of claim 30,
    wherein said valve stroking mechanism is a double acting mechanism;
    wherein said spool valve includes a spool pneumatically controlled by said solenoid valve, such that in one position said spool interconnects said valve stroking mechanism to a pressurized gas source so the remote valve is opened and in a second position said spool interconnects said valve stroking mechanism to the pressurized gas source so the remote valve is closed; and wherein said pneumatically controlled spool simultaneously exhausts gas from a portion of the actuator while admitting pressurized gas to another portion of the actuator so the remote valve is selectively opened and closed.

33. The pneumatic actuator of claim 30, wherein said valve stroking mechanism includes a plurality of springs and wherein said spool valve includes a spool pneumatically positioned by said solenoid valve, such that in one position said spool interconnects the remote valve stroking mechanism to a pressurized gas source so the remote valve is moved to one position and in a second position said spool vents gas from a portion of the valve stroking mechanism so at least said springs cause the remote valve to move to another position.

34. The pneumatic actuator of claim 30, wherein said spool valve is mounted to said housing so said spool valve is in fluid communication with ports in said housing that are in fluid communication with said valve stroking mechanism to selectively change the position of the remote valve.

35. The pneumatic actuator of claim 30, wherein said solenoid valve and said valve position mechanism are mounted in said housing, and wherein said housing includes a removable cover to access components of the pneumatic actuator mounted in said housing.

36. The pneumatic actuator of claim 30 further comprising at least one actuator probe extending into said housing and being selectively moveable responsive to motion of said valve stroking mechanism, and wherein said valve position mechanism is responsive to the motion of said at least one actuator probe.

37. The pneumatic actuator of claim 36 comprising two actuator probes, each of said actuator probes extending into said housing and being selectively moveable responsive to motion of said valve stroking mechanism, and wherein said valve position mechanism is responsive to the motion of said actuator probes.

38. The pneumatic actuator of claim 37, wherein said valve position mechanism includes two probe end sensors each for determining a position of an end of a corresponding one of said actuator probes.

39. The pneumatic actuator of claim 38, wherein said valve position mechanism provides one signal when one of said probe sensors determines that the end of the corresponding actuator probe is at a position representative of the remote valve being opened, and wherein said valve position mechanism provides another signal when the other probe sensor determines that the end of the corresponding other actuator probe is at a position representative of the remote valve being closed.

40. The pneumatic actuator of claim 38, wherein each of said probe sensors includes an inductive proximity switch.

41. The pneumatic actuator of claim 38, wherein each of said probe end sensors includes a mechanical switch that is activated by the end of said corresponding actuator probe.

42. The pneumatic actuator of claim 30, wherein said valve stroking mechanism includes:

two guide rods;

two pistons each having at least one surface with spaced teeth thereon; and, a shaft having spaced teeth for engaging the teeth on the surfaces of said pistons, said shaft being connectable to the remote valve so rotation of said shaft causes the valve to change position;

wherein each guide rod is secured in one aperture of one of said pistons and slidably disposed in an aperture of the other of said pistons;

wherein one position of said spool valve interconnects the pressurized gas source to said valve stroking mechanism such that gas is admitted between said pistons thereby causing said pistons to move apart so said shaft rotates in one direction; and wherein another position of said spool valve interconnects the pressurized gas source to said valve stroking mechanism such that gas is admitted outboard of said pistons thereby causing said pistons to move towards each other so said shaft rotates in another direction.

43. The pneumatic actuator of claim 42 further comprising at least one actuator probe extending into said housing, and wherein said at least one actuator probe is responsive to the motion of one of said guide rods.

44. The pneumatic actuator of claim 42 further comprising two actuator probes extending into said housing, and wherein each of said actuator probes is responsive to the motion of a corresponding one of said guide rods.

45. The pneumatic actuator of claim 30 further comprising at least one visual indicating mechanism for providing a visual indication of at least the position of the remote valve in response to a signal from said valve position mechanism.

46. The pneumatic actuator of claim 45 comprising a plurality of visual indicating mechanisms, at least one of which provides said visual indication of the position of the remote valve, and at least another of which provides a visual indication of the operation of the solenoid valve.

47. The pneumatic actuator of claim 30, wherein said end cap and said housing are separate pieces and said housing is adapted for mounting to said end cap.

* * * * *